United States Patent [19]

von Wedemayer

[11] Patent Number: 5,575,073
[45] Date of Patent: Nov. 19, 1996

[54] APPARATUS FOR SETTING A HORIZONTAL PLANE BY MEANS OF A LEVEL

[75] Inventor: Peter von Wedemayer, Annweiler am Trifels, Germany

[73] Assignee: Stabila Messgerate Gustav Ullrich GmbH & Co. KG, Germany

[21] Appl. No.: 382,137

[22] Filed: Feb. 1, 1995

[30] Foreign Application Priority Data

Feb. 3, 1994 [DE] Germany ............... 9401752 U

[51] Int. Cl.⁶ ............... G01C 5/00; G01C 9/10; G01C 15/10
[52] U.S. Cl. ............... 33/365; 33/285; 33/291; 33/370
[58] Field of Search ............... 33/365, 282, 283, 33/291, 370, 371, 374, 375, DIG. 1

[56] References Cited

U.S. PATENT DOCUMENTS

| | | | |
|---|---|---|---|
| 368,308 | 8/1887 | Richardson | 33/285 |
| 753,149 | 2/1904 | Lankford | 33/285 |
| 1,270,074 | 6/1918 | Veenstra | 33/370 |
| 1,836,137 | 12/1931 | Theis | 33/283 |
| 4,221,483 | 9/1980 | Rando . | |
| 4,593,475 | 6/1986 | Mayes | 33/DIG. 1 |
| 4,745,689 | 5/1988 | Hiltz | 33/DIG. 1 |
| 5,063,679 | 11/1991 | Schwandt | 33/370 |

FOREIGN PATENT DOCUMENTS

| | | |
|---|---|---|
| 2944408 | 6/1980 | Germany . |
| 3019860 | 12/1981 | Germany . |
| 3337370 | 4/1985 | Germany . |

*Primary Examiner*—Christopher W. Fulton
*Attorney, Agent, or Firm*—Ostrolenk, Faber, Gerb & Soffen, LLP

[57] ABSTRACT

An apparatus for setting a level plane includes a spirit level having a parallelepiped shaped housing with a measuring base and a leveling plate with an upper plate surface on which the base of the housing of the level is disposed. The upper plate of the leveling plate may be tilt orientation adjusted with respect to a lower plate that is spaced away from the upper plate by adjustment screws between the upper and lower plates. The upper plate includes a ferromagnetic material and a pivot pin projecting up from it. The spirit level housing has a hole in which the pivot pin is disposed enabling the housing to be pivoted around the surface of upper plate. A retaining magnet in the housing in the region of the measuring base holds the housing to the upper plate. Alternatively, the spirit level housing has the ferromagnetic material while the magnet is in the upper plate. Alternatively, also, the housing includes the pin while the hole is in the upper plate. Pivot the housing to an orientation whose level is to be set and then adjust the adjusting screws for obtaining a horizontal setting. Doing this at several pivot orientations enables the upper surface of the upper plate to be set horizontal using the level.

19 Claims, 2 Drawing Sheets

5,575,073

APPARATUS FOR SETTING A HORIZONTAL PLANE BY MEANS OF A LEVEL

BACKGROUND OF THE INVENTION

The present invention relates to apparatus for setting a horizontal plane, using a conventional level, particularly a spirit level having a housing, or if appropriate, a laser spirit level.

Leveling plates have been used for many years for leveling theodolites and other optical measuring instruments. They usually include upper and lower plates, which can be adjusted with respect to each other in two planes with the aid of adjustment screws, and leveling means in the form of a spirit level with which the horizontal alignment can be monitored. A leveling plate includes a further device, for example a threaded connection, for fastening the plate on a stand as well as securing means for fastening the actual measuring instrument to the plate.

Recently, there has been increasing use of so-called laser spirit levels. This is an optical measuring instrument with two leveling means oriented at right angles with respect to one another, and whose form and structure corresponds to that of a conventional spirit level. A laser and suitable optics are accommodated in the housing. The laser beam is adjusted to be exactly parallel to the measuring base of the spirit level body.

For fastening spirit levels, irrespective of whether they have a laser integrated in them, conventional leveling plates have special generally U-shaped clamping devices. The bearing surfaces of the devices have to be aligned with a high degree of precision so that they are at right angles with respect to the pivot axis of the leveling plate. This requires high machining costs. Fastening the spirit level in the clamping device also requires great accuracy by the user. Finally, conventional leveling plates are also equipped with complex mountings, in order that the optical measuring instrument might be adjusted, and particularly pivoted, precisely. These are costly because they should be free of play. Often, however, these mountings are not free of play, or over time become no longer free of play. Thus they have to be regularly readjusted. Moisture and dirt may also cause disruptions.

SUMMARY OF THE INVENTION

It is an object of the present invention to provide a simple and cost effective combination of a spirit level and a leveling plate, which can be used without impairing optical accuracy.

This object is achieved using an apparatus having the following features.

The leveling plate includes an upper plate. The upper plate has a planar usually upper surface. The spirit level is in or on a housing that includes a measuring base. Releasable fastening of the spirit level and its housing on the upper plate is accomplished with a magnet connection and a pivot pin connection. There is a retaining magnet in one of the plates and the spirit level housing and, cooperating ferromagnetic material in the other side. Also, there is a pivot pin in one of the plates and the spirit level housing and a cooperating pin receiving hole in the other. For example, in one embodiment, the upper plate is comprised of a ferromagnetic material.

Then the housing has at least one retaining magnet in the region of its measuring base. As an alternative, the magnet may be in the upper plate while the ferromagnetic material is in the housing at the base.

In one embodiment, pivot pin is located at and projects from the surface of the upper plate. The spirit level then has a hole through its base that corresponds in location with the pivot pin, and the housing of the level is installed on the pin. As an alternative, the pivot pin could project from the housing of the level, while the upper plate has a hole that receives the pin. Other pivot enabling means may be provided.

A considerable advantage of the present invention results from the use of magnets for releasably fixing the spirit level on the leveling plate. The upper side of the leveling plate is surface ground. The magnet causes the measuring base of the spirit level housing to always bear in a deviation free manner on the planer upper surface of the upper plate of the leveling plate.

The pivot pin and corresponding hole each located on one of the surfaces of the upper plate and the spirit level effect simple, but satisfactory, centering and pivot mounting. This arrangement does not have to be free of play, and this is a further considerable advantage of the invention.

In one embodiment, the upper plate of the leveling plate is comprised of a ferromagnetic material, for example steel. The spirit level and housing then has at least one retaining magnet in the region of its measuring base. This arrangement is appropriate when the spirit level and housing are comprised of non-magnetic material, e.g. a light metal. In particular, a retaining magnet is inserted into the non-magnetic upper plate. The spirit level has ferromagnetic properties, at least in the region of the retaining magnet in the upper plate. In the simplest design, a piece of iron is inserted into the spirit level housing.

For the pivot pin and cooperating hole, in one embodiment, the pivot pin is located on the surface of the upper plate while the hole is in the measuring base of the spirit level. This permits the spirit level to alternatively be used without the leveling plate. In another embodiment, the upper plate has the pin receiving hole while the pin is located on the measuring base of the spirit level. It is recommended here to render the pivot pin capable of being countersunk.

Preferably, the pin/hole connection is located in the center of the magnet retaining force. As a result, additional moments do not arise upon pivoting of the spirit level.

Suitable adjustment of the magnet retaining force achieves play free pivoting in the horizontal direction and, at the same time, provides a desirable braking and/or adhering force.

Other features and advantages of the present invention will become apparent from the following description of the invention which refers to the accompanying drawings.

DETAILED DESCRIPTION OF THE INVENTION

Figure 1:
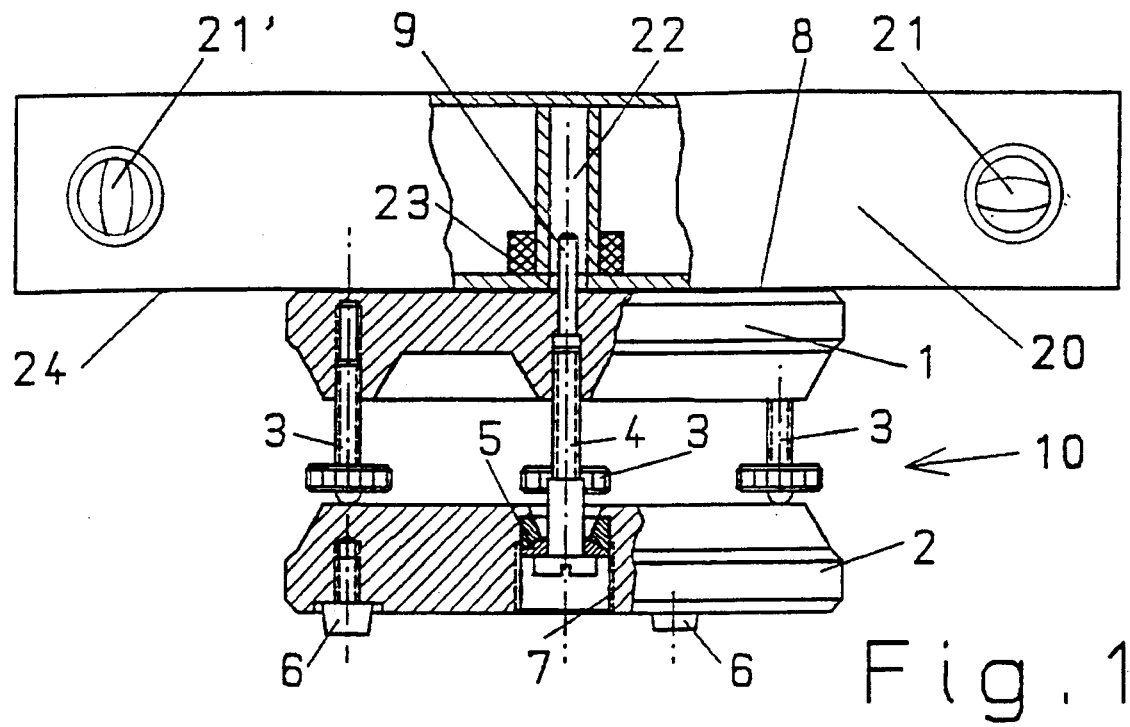
FIG. 1 is a partially broken away side and cross-sectional view of a combination of a spirit level and a leveling plate.
Figure 2:
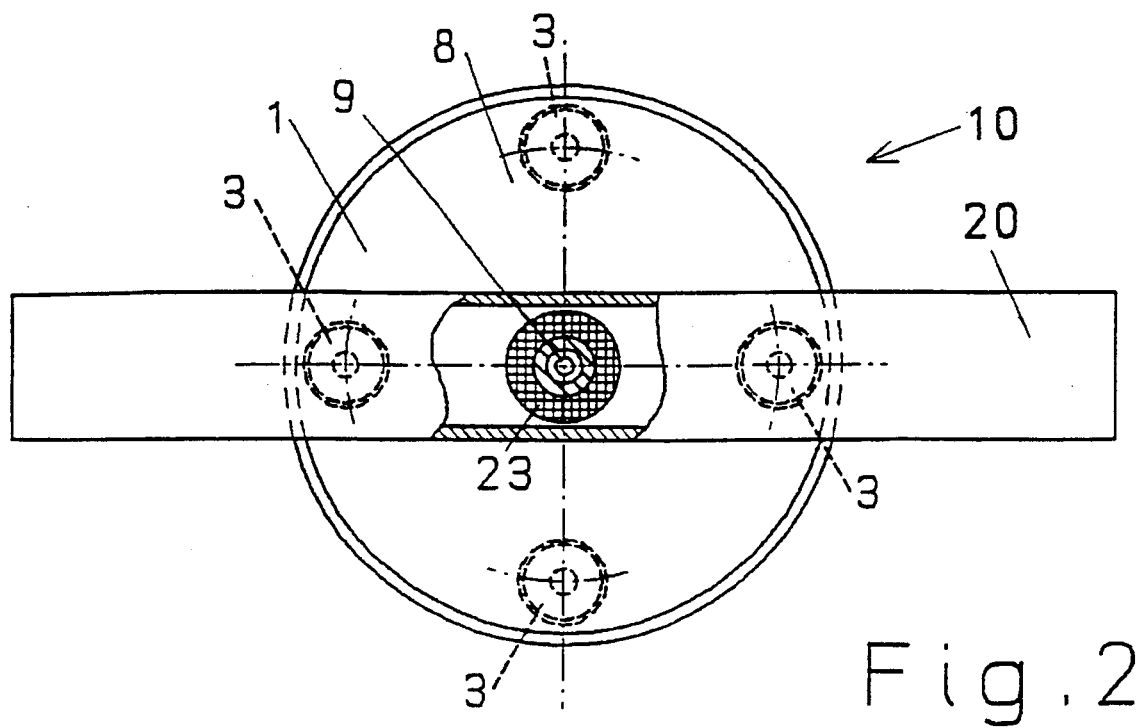
FIG. 2 is a plan view, also partially broken away, of the combination of FIG. 1.

FIGS. 1 and 2 show a combination comprising a spirit level 20 having leveling means 21, 21' and a leveling plate 10. The plate 10 is comprised of an upper plate 1 in the form of a circular disk and a lower plate 2 also in the form of another circular disk. These are releasably connected to one another by a central connecting screw 4. The central connecting screw 4 is mounted in the lower plate 2 by means of spherical washer and ball socket 5. As a result, the upper plate 1 can be tilted around any horizontal axis, i.e. effect a tumbling motion with respect to the lower plate 2. Four independently operable adjustment screws 3 are provided between the upper and lower plates 1, 2. The upper plate can be tilted in any direction depending upon how the adjustment screws 3 are selectively actuated.

A stand thread 7 is provided for fastening the lower plate 2 on securing means, for example on a stand. Three support feet 6 permit the leveling plate 10 to be deposited on an underlying surface.

The upper plate 1 is comprised of or consists of a ferromagnetic material, for example steel. Its top support surface 8 is ground absolutely planar. It serves as a bearing surface for the measuring base 24 of the spirit level 20. A pivot pin 9 projects up from the center of the support surface 8. The housing of the spirit level 20 has a corresponding hole 22. As illustrated in FIGS. 1 and 2, the hole 22 and the entrance into it in the housing base 24 are of larger diameter than the pin 9, enabling play between the pin and the housing. After the spirit level 20 has been installed onto the pivot pin 9, the pin 9 in the hole 22 provides a pin/hole connection about which the spirit level 20 can be pivoted. Obviously, positions of the pin and the hole can be exchanged.

At least one retaining magnet 23 for fixing the housing of the spirit level 20 on the upper plate 1 is integrated into the housing of the spirit level 20. The retaining magnet 23 is positioned such that the center of the magnet retaining force coincides with the pivot pin 9 and/or with the corresponding hole 22 in the spirit level housing. This prevents tilting moments when the spirit level 20 is pivoted about the pivot pin 9. The measuring base 24 of the spirit level 20 is always located in a plane, to be precise irrespective of the current angular position.

For leveling the upper plate 1, the tilt orientation of the spirit level 20 is first set via two diagonally opposite adjustment screws 3. These are adjusted until the leveling means 21, of the spirit level 20 is centered. The spirit level 20 is then pivoted around pin 9 through 90 degrees, and the two other adjustment screws 3 are set. The two adjustments are checked once again, and are finely readjusted if necessary, until the leveling operation is complete. By thus pivoting the spirit level 20 about the pivot pin 9, the desired horizontal plane can then be set in a play free manner because the measuring base 24 is always located in a planar manner on the planer surface 8 of the upper plate 1.

Figure 3:
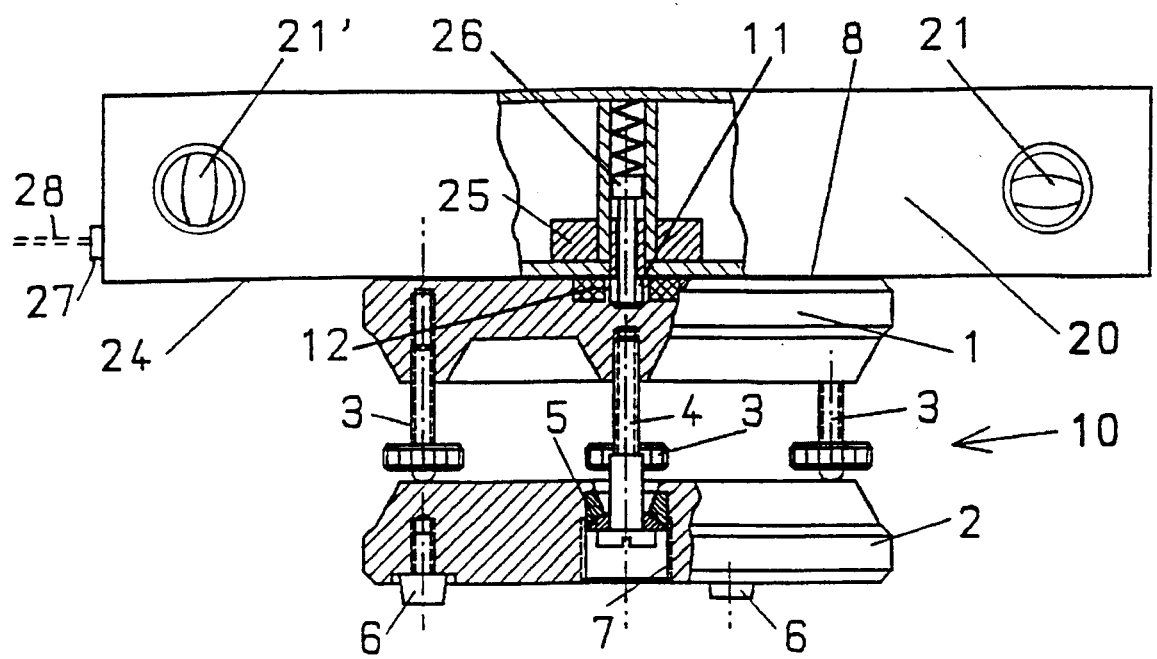
FIG. 3 is a partially broken away side view of a second combination.

In the second embodiment of FIG. 3, the upper plate 1 is comprised of non-magnetic material. A retaining magnet 12 is inserted into the ground surface 8. There is a depression 11 in the upper plate 1 at the center of the magnetic retaining force.

A pivot pin 26 is inserted in a resilient manner into the spirit level 20. It projects beyond the measuring base 24 and penetrates into the depression 11 in the upper plate 1. It produces the pin in hole connection about which the spirit level 20 can pivot.

The combination of the leveling plate 10 and the spirit level 20 functions just as well if the leveling means are integrated into the upper plate 1.

The spirit level 20 in FIG. 3 may be a laser spirit level with the laser 27, which produces a beam 28, accommodated in the housing 20. Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. An apparatus for setting a horizontal plane, comprising
   a leveling apparatus which indicates when it is level, the leveling apparatus having a housing and the housing having a measuring base;
   a leveling plate for receiving the measuring base of the housing of the leveling apparatus; the leveling plate including an upper plate having a planar surface on which the measuring base of the housing is movably disposed, the planar surface being substantially precisely planar so that the measuring base of the leveling apparatus being in direct contact therewith, thereby to provide exacting measurements;
   tilt adjustment means for adjusting the tilt orientation of the upper plate of the leveling plate and for thereby adjusting the tilt orientation of the measuring base of the housing on the upper plate to a selected level setting;
   cooperating pivot means at the upper plate and at the housing for enabling the housing to be pivoted to various orientations around the upper plate by pivoting around the pivot means;
   respective magnet means at the upper plate and in the housing generally at the measuring base for attracting the housing and its measuring base to rest on the planar surface of the upper plate in any selected pivot orientation of the housing around the planar surface of the upper plate.

2. The apparatus of claim 1, further comprising the leveling plate including the upper plate and a lower plate below the upper plate and wherein the tilt adjustment means comprises the upper or lower plate respectively comprising a plurality of independent adjustment devices spaced around the leveling plate for being adjusted to adjust the tilt orientation of the upper plate and of the measuring base thereon.

3. The apparatus of claim 2, further comprising the leveling plate including the upper plate and a lower plate below the upper plate and wherein each of the adjustment devices comprises an adjustment screw which is selectively screwed into the upper or lower plate respectively and comprises another surface against which the adjustment screw engages, whereby rotation of each adjustment screw with reference to the upper or lower plate respectively adjusts the tilt orientation of the upper plate.

4. The apparatus of claim 1, wherein the pivot means comprises a pivot pin at one of the leveling apparatus housing and the upper plate and a hole in the other of the housing and the upper plate for receiving the pivot pin, such that when the pivot pin is installed in the hole, the housing can be pivoted around the pivot pin to a selected orientation around the upper plate.

5. The apparatus of claim 4, wherein the hole for the pin is located at the center of the magnet retaining force of the magnet means.

6. The apparatus of claim 4, wherein the pivot pin is of smaller diameter than the hole for receiving the pivot pin.

7. The apparatus of claim 1, wherein the magnet means comprises the upper plate being comprised of ferromagnetic material, and a retaining magnet in the housing in the region of the measuring base thereof, though not in direct contact with the upper plate, for holding the measuring base to the upper plate while permitting the housing to be pivoted around the upper plate.

8. The apparatus of claim 1, wherein the housing is parallelepiped shaped.

9. The apparatus of claim 1, wherein the leveling apparatus comprises a spirit level.

10. The apparatus of claim 9, wherein the spirit level comprises a laser spirit level with a laser accommodated in the housing.

11. The apparatus of claim 1 wherein the pivot means comprises a pivot pin at the surface of the upper plate and a hole in the housing to correspond with and receive the pivot pin, such that when the pivot pin is installed in the hole, the housing can be pivoted around the pivot pin to a selected orientation around the upper plate.

12. The apparatus of claim 11, wherein the magnet means comprises the upper plate being comprised of a ferromagnetic material, and a retaining magnet in the housing in the region of the measuring base thereof, though not in direct contact with the upper plate, for holding the measuring base to the upper plate while permitting the housing to be pivoted around the upper plate.

13. The apparatus of claim 11, wherein the hole in the housing which receives the pivot pin is of larger diameter than the pivot pin.

14. The apparatus of claim 1, wherein the pivot means comprises a pivot pin at the housing and a hole in the upper plate to correspond with and receive the pivot pin, such that when the pivot pin is installed in the hole, the housing can be pivoted around the pivot pin to a selected orientation around the upper plate.

15. The apparatus of claim 14, wherein the pivot pin is countersunk.

16. The apparatus of claim 1, wherein the magnet means comprises the upper plate being comprised of a non-magnetic material, and a retaining magnet in the upper plate; the housing being comprised of ferromagnetic material at the housing in the region of the retaining magnet for holding the measuring base to the upper plate while permitting the housing to be pivoted around the upper plate.

17. The apparatus of claim 1, further comprising a lower plate of the leveling plate spaced from the upper plate and with respect to which the upper plate may be tilted; a central connecting screw between the upper and lower plates of the leveling plate, and the pivot pin being a part of the central connecting screw.

18. The apparatus of claim 1, wherein the tilt adjustment means comprises a plurality of independent adjustment screws spaced around the leveling plate for being adjusted to adjust the tilt orientation of the upper plate and of the measuring base thereon, each adjustment screw being selectively screwed into the upper or lower plate respectively;

another surface against which each adjustment screw engages, whereby rotation of each adjustment screw with reference to the upper or lower plate respectively adjusts the tilt orientation of the upper plate; the adjustment screws normally continuously engaging the lower or upper plate respectively and being screwed into the upper or lower or upper plate respectively, so that the extent to which the adjustment screws are screwed into the upper or lower respectively determines the tilt orientation of the upper plate with reference to the lower plate.

19. An apparatus for setting a horizontal plane, comprising a leveling apparatus which indicates when it is level, the leveling apparatus having a housing and the housing having a measuring base;

a leveling plate for receiving the measuring base of the housing of the leveling apparatus; the leveling plate including an upper plate having a planar surface on which the measuring base of the housing is movably disposed;

tilt adjustment means for adjusting the tilt orientation of the upper plate of the leveling plate and for thereby adjusting the tilt orientation of the measuring base of the housing on the upper plate to a selected level setting;

cooperating pivot means at the upper plate and at the housing for enabling the housing to be pivoted to various orientations around the upper plate by pivoting around the pivot means;

respective magnet means at the upper plate and within the housing generally at the measuring base for attracting the housing and its measuring base to rest on the planar surface of the upper plate in any selected pivot orientation of the housing around the planar surface of the upper plate, the magnetic means within the housing not being in direct contact with the magnet means at the upper plate.

* * * * *